(12) United States Patent
Morikami

(10) Patent No.: US 10,343,324 B2
(45) Date of Patent: Jul. 9, 2019

(54) LIQUID BLOW MOLDING APPARATUS

(71) Applicant: DISCMA AG, Hunenberg (CH)

(72) Inventor: Shigeki Morikami, Kanagawa (JP)

(73) Assignee: Discma AG, Zürich (CH)

(*) Notice: Subject to any disclaimer, the term of this patent is extended or adjusted under 35 U.S.C. 154(b) by 103 days.

(21) Appl. No.: 15/570,565

(22) PCT Filed: Apr. 18, 2016

(86) PCT No.: PCT/JP2016/002075
§ 371 (c)(1),
(2) Date: Oct. 30, 2017

(87) PCT Pub. No.: WO2016/174847
PCT Pub. Date: Nov. 3, 2016

(65) Prior Publication Data
US 2018/0126625 A1 May 10, 2018

(30) Foreign Application Priority Data
Apr. 30, 2015 (JP) ................................. 2015-093665

(51) Int. Cl.
B29C 49/46 (2006.01)
B29C 49/06 (2006.01)
B29C 49/00 (2006.01)
B29C 49/60 (2006.01)
B29C 49/58 (2006.01)
B29C 49/42 (2006.01)
B29C 49/12 (2006.01)
B29C 49/78 (2006.01)

(52) U.S. Cl.
CPC .......... B29C 49/06 (2013.01); B29C 49/0073 (2013.01); B29C 49/46 (2013.01); B29C 49/58 (2013.01); B29C 49/60 (2013.01); *B29C 49/12* (2013.01); *B29C 49/4289* (2013.01); *B29C 49/786* (2013.01); *B29C 2049/465* (2013.01); *B29C 2049/6072* (2013.01)

(58) Field of Classification Search
CPC .............. B29C 49/46; B29C 2049/465; B29C 2049/4664
See application file for complete search history.

(56) References Cited

U.S. PATENT DOCUMENTS

2017/0291345 A1* 10/2017 Toyoda ................... B29C 49/46

FOREIGN PATENT DOCUMENTS

DE  102014015201 A1 *  4/2016  ............. B29C 49/46
EP  2823948 A1  1/2015
(Continued)

*Primary Examiner* — Robert B Davis
(74) *Attorney, Agent, or Firm* — Eric J. Sosenko; Jonathan P. O'Brien; Honigman LLP

(57) ABSTRACT

A liquid blow-molding apparatus in which a liquid circulates between a feed path formed in a support block, when a valve mechanism is in a closed state, and a pressurized liquid feed unit, and pressurized liquid is fed from the feed path through a blow nozzle into a preform when the valve mechanism is in an open state. The feed path has a shape including a flow path body, a dome chamber that is formed in a domed shape and that is continuous with an upper end of the flow path body, a first port that has the same upper end as the dome chamber and which extends horizontally from the dome chamber, and a second port connected to the flow path body.

5 Claims, 4 Drawing Sheets

(56) References Cited

FOREIGN PATENT DOCUMENTS

| | | | |
|---|---|---|---|
| JP | 2013-154617 A | 8/2013 | |
| JP | 2013-248748 A | 12/2013 | |
| JP | 2015-066921 A | 4/2015 | |
| WO | WO-2016047067 A1 * | 3/2016 | ............. B29C 49/46 |
| WO | WO-2017187698 A1 * | 11/2017 | ............. B29C 49/12 |

* cited by examiner

LIQUID BLOW MOLDING APPARATUS

BACKGROUND

1. Technical Field

The present invention relates to a liquid blow-molding apparatus for liquid blow-molding a thermoplastic synthetic resin preform into a container of a specific shape.

2. Related Technology

Containers made of synthetic resins, exemplified by polypropylene (PP) bottles and polyethylene terephthalate (PET) bottles, are used to hold various liquids, such as beverages, cosmetics, chemicals, detergents, and shampoos. Such containers are generally manufactured by heating a preform, obtained by molding a thermoplastic resin material into a closed-bottom cylindrical shape, to a temperature at which thermoplasticity manifests, and using a blow molding apparatus to blow mold the preform in this state.

One known apparatus for blow molding a preform is a liquid blow-molding apparatus, which comprises a blow molding die in which a preform is disposed, a blow nozzle that engages with a mouth of the preform disposed in the blow molding die, and a pressurized liquid feed unit for feeding pressurized liquid to the blow nozzle, wherein pressurized liquid is fed from the pressurized liquid feed unit through the blow nozzle into the interior of the preform, thereby liquid blow-molding the preform into a container of a specific shape. In accordance with such a liquid blow-molding apparatus, a liquid to be contained in the container as part of the final product, such as a beverage, can be used as the liquid fed to the preform in order to eliminate the need for a post-molding step of filling the container with the liquid, thereby simplifying the production process and the configuration of the liquid blow-molding apparatus.

However, as liquids have a higher rate of thermal conductivity with respect to the heated preform than gases, variations in the temperature of the liquid fed to the preform when performing liquid blow molding using the liquid blow-molding apparatus will cause the temperature of the preform to vary as well, thereby problematically reducing the moldability of the container and negatively affecting the capabilities, such as strength and heat resistance, of the molded container.

Thus, in the liquid blow-molding apparatus disclosed in Unexamined Japanese Patent Application Publication No. 2013 154617, for example, a feed path connected to the pressurized liquid feed unit is formed in the support block, a blow nozzle connected to the feed path is provided at a lower end of the support block, a valve mechanism is provided between the feed path and the blow nozzle, the valve mechanism is closed in order to circulate a liquid between the pressurized liquid feed unit and the feed path while adjusting the liquid blow-molding apparatus to a specific temperature, and liquid blow molding can be performed by opening the valve mechanism to feed the liquid having been adjusted to the specific temperature to the preform, thereby improving the moldability of the container.

However, if, for example, a premade product is used to manufacture the support block of the conventional liquid blow-molding apparatus described above, stepped sections or raised/recessed shapes may be formed in the feed path, so that the feed path comprises multiple air pockets (locations where air tends to accumulate) in its interior. In such cases, air accumulated in the air pockets is fed into the preform along with the liquid, thereby potentially reducing the moldability of the container. Moreover, when the valve mechanism is closed and the liquid is circulated, stagnant pools of liquid form in the air pockets, thereby potentially reducing precision in adjusting the temperature of the circulating liquid and reducing container moldability.

While it is conceivable to provide air release valves at the air pockets in the feed path, such an arrangement results in an oversized, expensive apparatus, and is incapable of solving the problem of pooling liquid.

SUMMARY

The present invention was developed in view of these problems, and, in one aspect, inexpensively provides a liquid blow-molding apparatus that is capable of precisely molding a container without air pockets or liquid pooling occurring in the liquid feed path.

The liquid blow-molding apparatus according to the principles of the present invention is a liquid blow-molding apparatus provided with: a blow molding die in which is disposed a closed-bottom cylindrical preform, a support block disposed above the blow molding die and having a feed path formed in its interior, a blow nozzle that is provided at a lower end of the support block continuously with the feed path and that engages with a mouth of a preform disposed in the blow molding die, and a pressurized liquid feed unit connected to the feed path, pressurized liquid being fed from the pressurized liquid feed unit through the blow nozzle into the interior of the preform to liquid blow-mold the preform into a shape conforming to a cavity of the blow molding die; the apparatus being characterized in that the feed path has a shape comprising a flow path body having a vertically extending inner diameter that is constant or decreases toward the blow nozzle, a dome chamber that is formed in a domed shape and is continuous with an upper end of the flow path body, a first port that has the same upper end as the dome chamber and which extends horizontally from the dome chamber, and a second port connected to the flow path body; a valve mechanism for opening and closing an open-and-closable flow path connecting the flow path body and the blow nozzle is provided in the open-and-closable flow path; and a liquid circulates between the feed path and the pressurized liquid feed unit when the valve mechanism is in a closed state, and pressurized liquid being fed from the feed path through the blow nozzle into the interior of the preform when the valve mechanism is in an open state.

In the liquid blow-molding apparatus according to the principles of the present invention, the first port and the second port preferably communicate via a liquid circulation section in which the pressurized liquid feed unit and the liquid are adjusted to a specific temperature.

In the liquid blow-molding apparatus according to the principles of the present invention, an air release valve is preferably provided at a site at the highest location of a circulation path leading from the pressurized liquid feed unit through the feed path and the liquid circulation section back to the pressurized liquid feed unit.

In the liquid blow-molding apparatus according to the principles of the present invention, it is preferable that a rod-shaped seal pin that passes through the flow path body and is capable of movement in the vertical direction be provided in the support block, the valve mechanism being placed into a closed state by a lower end of the seal pin contacting a seal part provided in the open-and-closable flow path, and into an open state by the lower end of the seal pin rising upward away from the seal part.

In the liquid blow-molding apparatus according to the principles of the present invention, the seal pin preferably comprises a rod slideably inserted in a liquid-tight state into a tubular housing.

In accordance with the principles of the present invention, it is possible to prevent the formation of air pockets within the feed path and prevent pooling of the liquid flowing through the feed path without the need to provide multiple air-release valves in the feed path. This results in an arrangement in which the liquid used as the pressurized fluid is circulated between the pressurized liquid feed unit and the feed path, wherein penetration of air into the liquid being fed from the feed path is prevented, and precision in adjusting the temperature of the liquid is increased, thereby enabling precise liquid blow molding of the container.

In this way, it is possible, in accordance with the principles of the present invention, to inexpensively provide a liquid blow-molding apparatus that is capable of precisely molding a container without air pockets or liquid pooling occurring in the liquid feed path.

DETAILED DESCRIPTION

The present invention will now be described in greater detail with reference to the drawings.

First, the overall configuration of a liquid blow-molding apparatus according to an embodiment incorporating the principles of the present invention will be described with reference to FIG. 1; the details of the main parts of this liquid blow-molding apparatus will be described with reference to FIG. 2. In the liquid blow-molding apparatus illustrated in FIGS. 1 and 2, a preform PF obtained by molding a thermoplastic resin material into a closed-bottom cylindrical shape is liquid blow-molded into a container of a specific shape. Liquid blow molding is performed using a pressurized liquid instead of pressurized air as the pressurized fluid fed into the preform PF.

Figure 1:
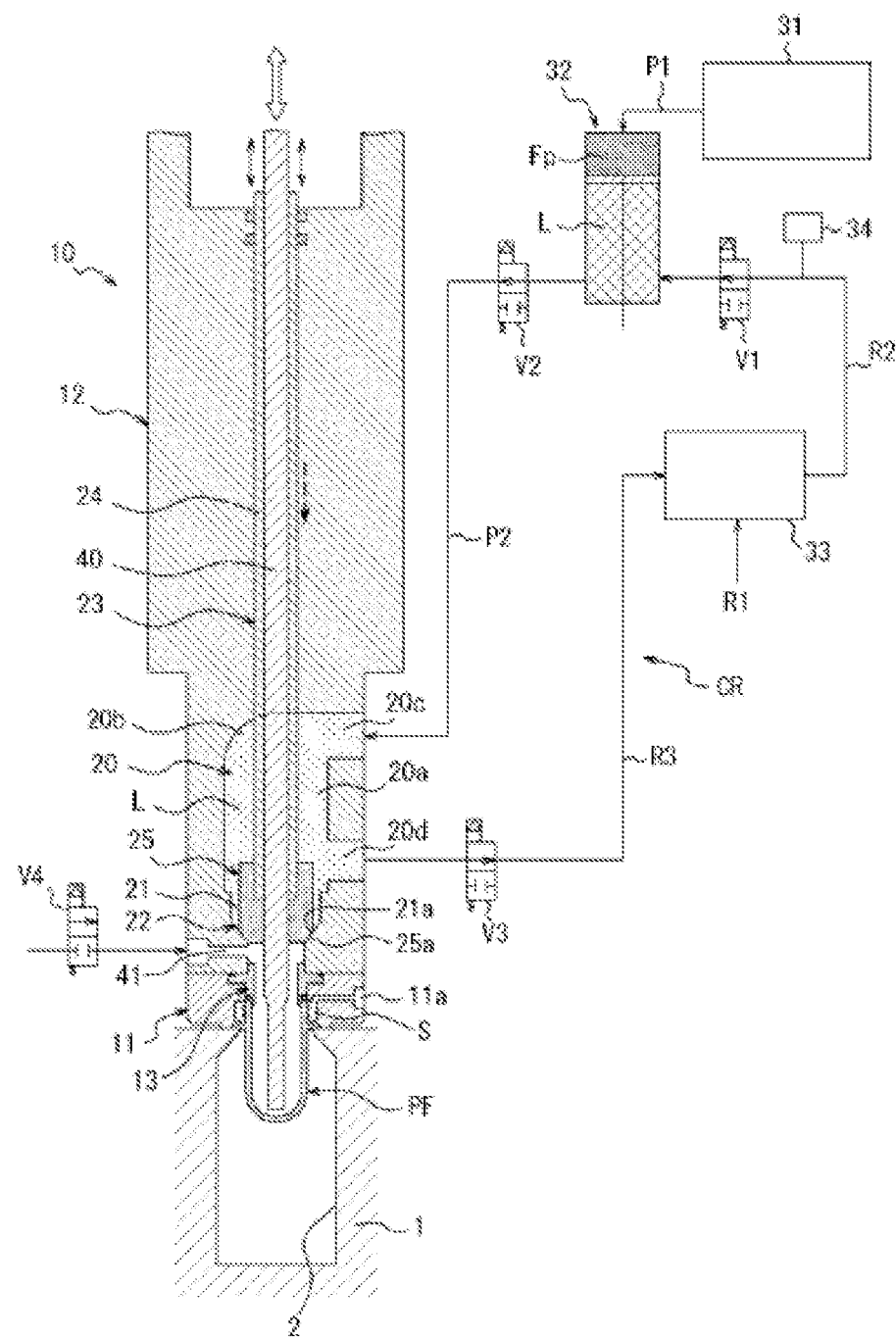
FIG. 1 is a schematic illustration of the overall configuration of a liquid blow-molding apparatus according to the principles of the present invention.

As shown in FIG. 1, the liquid blow-molding apparatus comprises a blow molding die 1. A cavity 2 of the blow molding die 1 has, for example, a bottle shape that opens upward on an upper face of the blow molding die 1. Although not shown in detail in the drawings, the blow molding die 1 is capable of opening to the left and right, and the blow molding die 1 can be opened to remove the molded container from the blow molding die 1.

The preform PF is set in the blow molding die 1. As illustrated in FIG. 2, the preform PF can be one obtained, for example, by molding a thermoplastic resin material such as polypropylene (PP) or polyethylene terephthalate (PET) into an overall closed-bottom cylindrical shape, a cylindrical mouth PFb being provided at an upper end of a test-tube-shaped body PFa, and a neck ring PFc being provided at a lower end of the mouth PFb. The preform PF is set in place in the blow molding die 1 so that the body PFa is disposed in the cavity 2 of the blow molding die 1, the neck ring PFc contacts the upper face of the blow molding die 1, and the mouth PFb protrudes (upward) out of the blow molding die 1.

A nozzle unit 10 that is capable of relative motion in the vertical direction with respect to the blow molding die 1 is provided above the blow molding die 1. The nozzle unit 10 is provided with a retaining member 11, a support block 12, and a blow nozzle 13.

Figure 2:
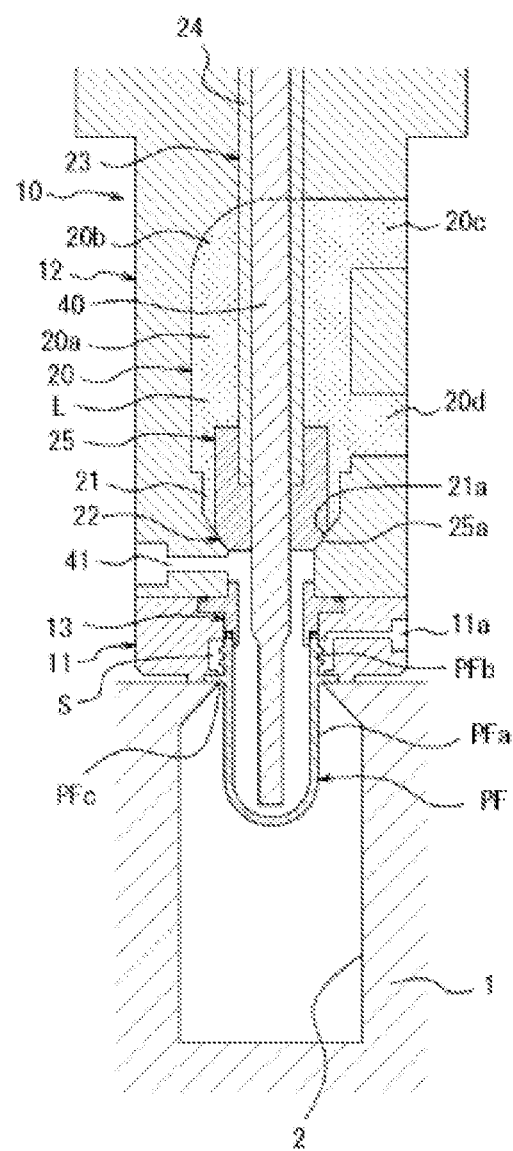
FIG. 2 is a magnified cross-sectional view of the main parts of the liquid blow-molding apparatus illustrated in FIG. 1.

As illustrated in FIG. 2, the retaining member 11 is formed as an annular block provided with a through-hole passing through the center thereof in the vertical direction, and the nozzle unit 10 contacts the upper face of the blow molding die 1 when lowered to its lower end. When the retaining member 11 contacts the upper face of the blow molding die 1, the mouth PFb of the preform PF set within the blow molding die 1 is disposed inside the retaining member 11, and the neck ring PFc is sandwiched between the retaining member 11 and the upper face of the blow molding die 1 so that the preform PF is held in a vertical orientation with respect to the blow molding die 1.

A space S surrounding the outer circumferential surface of the mouth PFb of the preform PF set in the blow molding die 1 and the inner circumferential surface of the retaining member 11 is defined therebetween, and an air hole 11a communicating with the space S is formed in the retaining member 11. Pressurized air is fed into the space S as necessary. An arrangement in which the retaining member 11 does not define a space S between itself and the outer circumferential surface of the mouth PFb of the preform PF, and is not provided with an air hole 11a, is also possible.

The support block 12 is formed from steel, for example, in a cylindrical shape in the interior of which is formed a feed path 20, is anchored to the upper end of the retaining member 11, and is capable of relative vertical movement along with the retaining member 11 with respect to the blow molding die 1.

As illustrated in FIG. 2, the feed path 20 is formed in a shape comprising a flow path body 20a, a dome chamber 20b, a first port 20c, and a second port 20d. The flow path body 20a has a circular cross-sectional shape, extends in the vertical direction along the axis of the support block 12, and has an inner diameter that is identical, i.e., constant, at all positions along the vertical direction. The dome chamber 20b is formed in a hemispherical shape having the same diameter as the flow path body 20a, and is continuous with the upper end of the flow path body 20a. The first port 20c has a circular cross-sectional shape with a diameter smaller than that of the flow path body 20a, has the same upper end as the dome chamber 20b, extends horizontally from the dome chamber 20b, and opens on a side surface of the support block 12. The second port 20d is continuous with the flow path body 20a of the feed path 20 between the first port 20c and an open-and-closable flow path 21, and extends horizontally therefrom to open on a side surface of the support block 12. In this way, the feed path 20 is formed so as to have a smooth inner face free of stepped sections from the first port 20c through the dome chamber 20b to the flow path body 20a. In the present embodiment, a pressurized liquid L is fed from the first port 20c to the feed path 20; thus, the first port 20c will be described as an injection port, and the second port 20d as a discharge port.

An open-and-closable flow path 21 coaxially continuous with the lower end of the flow path body 20a of the feed path 20 is provided below the feed path 20 of the support block 12. The open-and-closable flow path 21 extends in the vertical direction, a lower end thereof having a smaller diameter than an upper end thereof, and a downward-pointing conical-surfaced seal part 21a is provided therealong.

The blow nozzle 13 is attached to the lower end of the support block 12, and is sandwiched between the retaining member 11 and the support block 12. The blow nozzle 13 is formed in an overall cylindrical shape, and an opening in the upper end thereof is continuous with the open-and-closable flow path 21. In other words, the blow nozzle 13 is continuous with the feed path 20 through the open-and-closable flow path 21. When the nozzle unit 10 is lowered to a lower end position, as illustrated in FIG. 2, the lower end of the blow nozzle 13 engages with the mouth PFb of the preform PF set in the blow molding die 1, and communicates with the interior of the preform PF.

A valve mechanism 22 for opening and closing the open-and-closable flow path 21 is provided in the open-and-closable flow path 21. The valve mechanism 22 is provided with a rod-shaped seal pin 23, provided in the support block 12, that passes through the axial center of the flow path body 20a of the feed path 20 and is capable of vertical movement. The seal pin 23 is provided with a cylindrical seal member 25 anchored to the lower end of a tubular housing 24, and a tapered contact surface 25a is provided on the outer circumferential edge of the lower end surface of the seal member 25. The contact surface 25a has the same angle of inclination as the seal part 21a provided on the open-and-closable flow path 21, and is adapted so as to contact the seal part 21a when the seal pin 23 moves to the lower end of its stroke. In other words, when the seal pin 23 moves to the lower end of its stroke, the lower end of the seal pin 23, i.e., the contact surface 25a of the seal member 25, contacts the seal part 21a, putting the valve mechanism 22, i.e., the open-and-closable flow path 21, into a closed state, and cutting off communication between the feed path 20 and the blow nozzle 13. Conversely, when the seal pin 23 moves up, and the lower end of the seal pin 23, i.e., the contact surface 25a of the seal member 25, moves up and away from the seal part 21a, the valve mechanism 22, i.e., the open-and-closable flow path 21, enters an open state, and the feed path 20 and blow nozzle 13 communicate. In this way, the valve mechanism 22 is configured so that the contact surface 25a of the seal member 25 contacts and separates from the seal part 21a.

As illustrated in FIG. 1, a pressurization device 31, pressurized liquid feed unit 32, and liquid circulation section 33 are connected to the nozzle unit 10.

The pressurization device 31 is constituted, for example, by a pressurization pump, compressor, or the like, and is connected to the pressurized liquid feed unit 32 via a conduit P1. The pressurized liquid feed unit 32 can be constituted by, for example, a plunger pump or piston-cylinder mechanism, and is configured so as to be operated by pressurized fluid Fp fed from the pressurization device 31. The pressurized liquid feed unit 32 is connected to the first port 20c of the support block 12, i.e., to the feed path 20, via a conduit P2, and is capable of feeding pressurized liquid L to the feed path 20 at a specific pressure.

The liquid circulation section 33 has a function of adjusting the liquid L to a specific temperature while receiving fresh liquid L from a conduit R1, feeding the liquid L to the pressurized liquid feed unit 32 via a conduit R2, and circulating the liquid L between the pressurized liquid feed unit 32 and the feed path 20 while adjusting the liquid to the specific temperature. Specifically, the liquid circulation section 33 is connected to the second port 20d via a conduit R3 and to the pressurized liquid feed unit 32 via the conduit R2, and is capable of feeding the liquid L adjusted to the specific temperature through the conduit R2 to the pressurized liquid feed unit 32, from which the liquid is fed from the pressurized liquid feed unit 32 through the conduit P2 to the feed path 20, and adjusting liquid L discharged from the second port 20d to the specific temperature and returning the liquid to the pressurized liquid feed unit 32.

By virtue of such an arrangement, when the open-and-closable flow path 21 is closed by the valve mechanism 22, the liquid L is capable of circulating between the pressurized liquid feed unit 32 and the feed path 20 via a circulation path CR leading from the flow path body 20a in order through the second port 20d, conduit R3, liquid circulation section 33, conduit R2, pressurized liquid feed unit 32, conduit P2, first port 20c, dome chamber 20b, and flow path body 20a while being adjusted to the specific temperature by the liquid circulation section 33.

Three solenoid valves V1, V2, V3 are provided along the circulation path CR, and, when the open-and-closable flow path 21 is closed by the valve mechanism 22 and the liquid L circulates along the circulation path CR, all valves V1, V2, V3 are opened.

Conversely, when the liquid L is fed from the feed path 20 through the blow nozzle 13 into the preform PF, valves V1, V3 are closed to stop the circulation of the liquid L in the circulation path CR, and the valve mechanism 22 opens to put the open-and-closable flow path 21 into an open state. As a result, the liquid L travels from the pressurized liquid feed unit 32 through the feed path 20 and open-and-closable flow path 21 to the blow nozzle 13, and is fed through the blow nozzle 13 into the preform PF.

An air release valve 34 is preferably provided at a location at the highest part of the circulation path CR. In such an arrangement, air contaminating the liquid L circulating through the circulation path CR can be effectively released from the highest part of the path to the outside via the air release valve 34. It is thus possible to keep air from being fed into the preform PF along with the liquid L, allowing for more precise liquid blow molding.

An elongated cylindrical rod 40 is inserted into the axial center of the housing 24 in a liquid-tight state with respect to the housing 24 so as to be capable of sliding in the vertical direction. The rod 40 serves to lower the surface of the liquid L filling the container and provide a specific amount of headspace in cases in which the liquid L used as the pressurized fluid for liquid blow molding will be the liquid contents filling the molded container. The rod 40 is disposed coaxially with the blow nozzle 13, and is configured so that the tip (lower end) thereof is positioned near the floor of the interior of the preform PF set in the blow molding die 1 during liquid blow molding. The rod 40 can also be used as a drawing rod for longitudinally drawing the preform PF. A through-hole through which the rod 40 passes is provided in the center of the seal member 25.

Next, a procedure by which the preform PF is liquid blow-molded using the liquid blow-molding apparatus into a container having a shape conforming to the cavity 2 of the blow molding die 1 will be described with reference to FIGS. 1-4.

First, the preform PF, which, except for the mouth PFb, has been heated to a temperature suitable for liquid blow molding, is set in the blow molding die 1, with the mouth PFb protruding upward, and the die 1 is closed.

Next, the nozzle unit 10 is lowered, the retaining member 11 is brought into contact with the upper face of the blow molding die 1, the preform PF is retained in the blow molding die 1, and the blow nozzle 13 is engaged with the mouth PFb, yielding the state illustrated in FIGS. 1 and 2. At this time, the open-and-closable flow path 21 is in a closed state by the valve mechanism 22, and a certain length of the rod 40 is inserted into the preform PF. All of the valves V1, V2, V3 of the circulation path CR are opened, and the liquid L circulates through the circulation path CR while being adjusted to the specific temperature by the liquid circulation section 33.

At this time, the feed path 20 formed in the support block 12 has a shape comprising the flow path body 20a, which has a circular cross section with a constant inner diameter, the dome chamber 20b, which is formed in a hemispherical shape having the same diameter as the flow path body 20a and is continuous with the upper end of the flow path body 20a, and the first port 20c, which has the same upper end as the dome chamber 20b and a circular cross section extending horizontally from the dome chamber 20b; i.e., a smooth inner face free of stepped sections is formed from the first port 20c to the blow nozzle 13, eliminating any differences in level or pockets in which air pockets could form or the liquid L could pool in the interior of the feed path 20, thereby allowing the liquid L to circulate around the circulation path CR while being adjusted to the correct temperature without the liquid L pooling in the interior of the feed path 20. In other words, it is possible to suppress inconsistencies in the temperature of the liquid L circulating through the circulation path CR.

Figure 3:
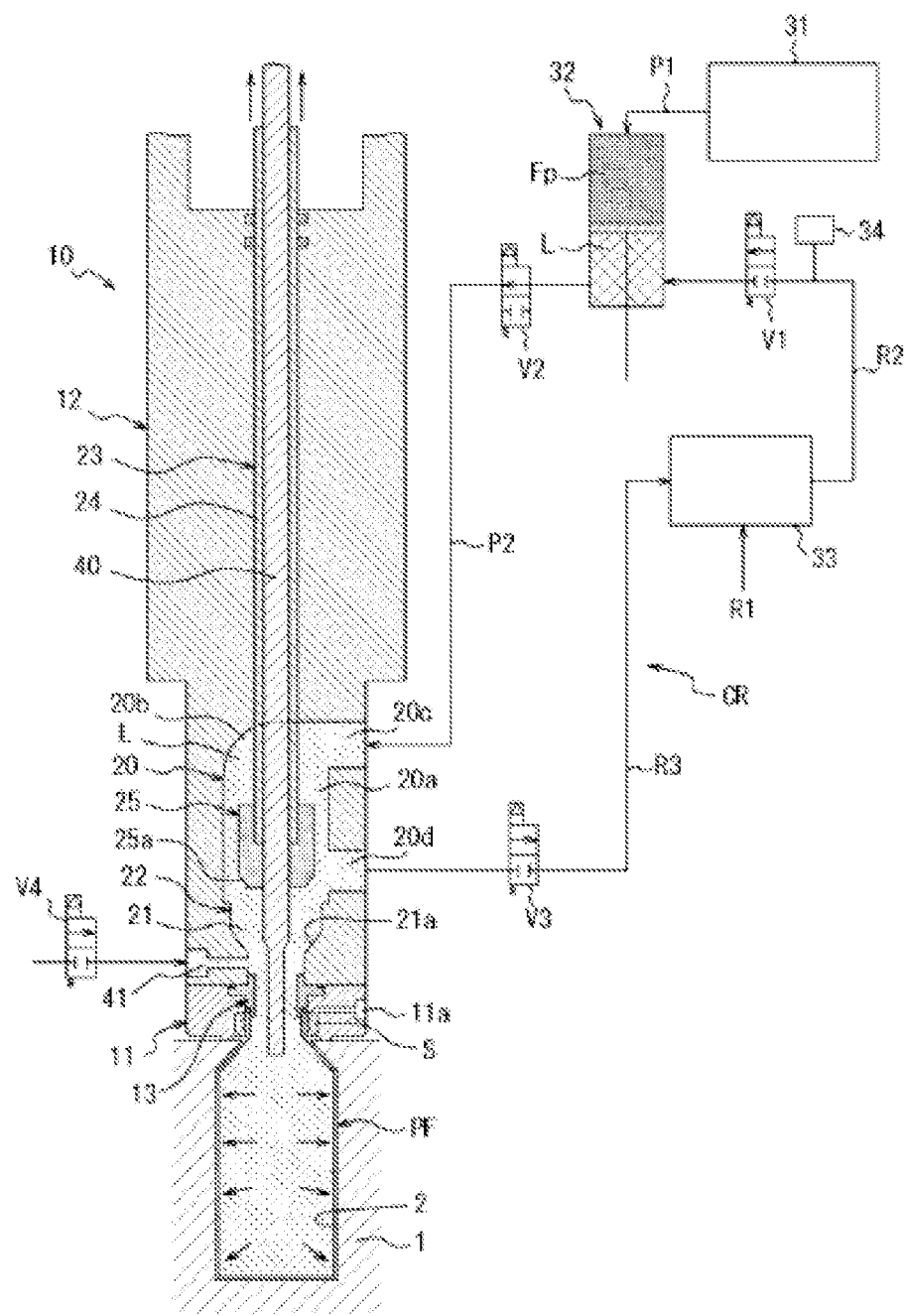
FIG. 3 is an illustration of a preform being liquid blow-molded into a container in the liquid blow-molding apparatus illustrated in FIG. 1.

Next, as illustrated in FIG. 3, the valves V1, V3 are closed to stop the circulation of the liquid L along the circulation path CR, while the seal pin 23 is moved upward to open the valve mechanism 22, and the pressurization function of the pressurized liquid feed unit 32 is activated, so that pressurized liquid L is fed from the pressurized liquid feed unit 32 via the feed path 20, open-and-closable flow path 21, and blow nozzle 13 through the mouth PFb into the interior of the preform PF. It is thus possible to draw the preform PF into an expanded state, thereby molding the preform PF into a container having a shape conforming to the cavity 2 of the blow molding die 1.

At this time, the feed path 20 formed in the support block 12 still has a smooth inner face free of stepped sections from the first port 20c to the blow nozzle 13, and there are no stepped sections or pockets in the interior of the feed path 20 in which air pockets could form or the liquid L could pool, thereby preventing contamination of the liquid L being fed from the pressurized liquid feed unit 32 through the feed path 20 to the preform PF with air, and allowing for more precise liquid blow molding of the preform PF by the pressurized liquid L.

If there is the possibility of the pressure of the liquid L causing the mouth PFb of the preform PF to deform and expand in diameter during this process, pressurized air can be introduced through the air hole 11a provided in the retaining member 11 so as to pressurize the space surrounding the outer circumferential surface of the mouth PFb to a specific pressure, thereby suppressing such deformation.

Figure 4:
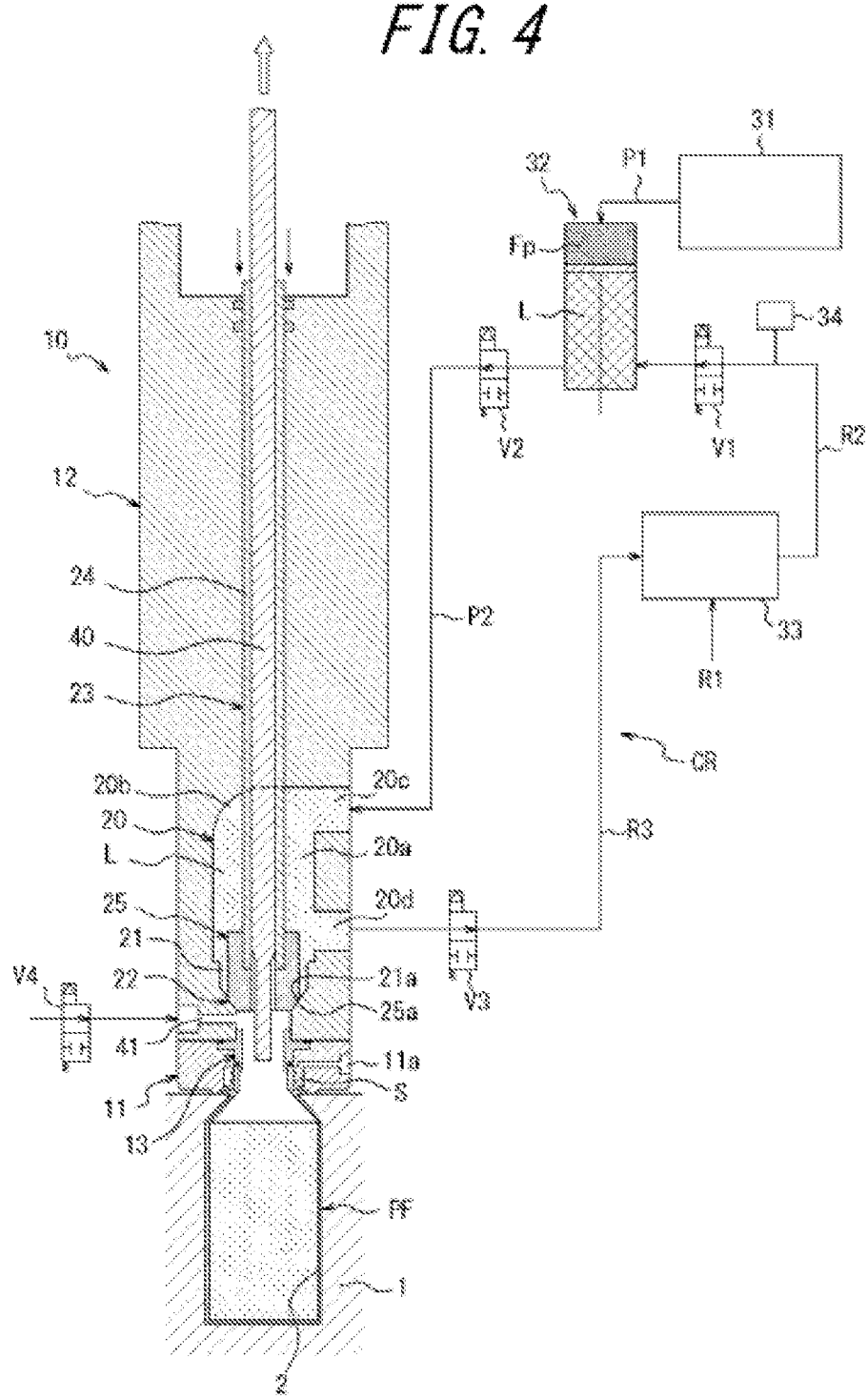
FIG. 4 is an illustration of a state in which a rod has been removed from the container in the state illustrated in FIG. 3.

Next, as illustrated in FIG. 4, the seal pin 23 is lowered, placing the open-and-closable flow path 21, i.e., the valve mechanism 22, into a closed state, and the valves V1, V2, V3 are opened to allow the liquid L to again circulate around the circulation path CR.

Simultaneously with or slightly after this process, the rod 40 is moved upward and removed from the molded container. The removal of the rod 40 at this time causes all the liquid L remaining in the blow nozzle 13 to flow into the container and the level of the liquid in the container to descend, thereby allowing the level of the liquid filling the container to be adjusted so as to leave a specific level of headspace within the interior of the container. After the rod 40 has moved upward, another process such as a suck-back process can be performed, as necessary, in order to more finely adjust the amount of liquid L filling the container. If a vacuum is formed in the container when the tip of the rod 40 is being withdrawn, thereby causing deformation, a valve V4 can be used to open an air intake hole 41 provided in the open-and-closable flow path 21, thereby mitigating the vacuum within the container.

Once the process described above has finished, the nozzle unit 10 moves upward, and the blow nozzle 13 is removed from the container. The mouth is then sealed with a cap, after which the blow molding die 1 is opened and the container filled with liquid L is removed. The cap may also be attached to the mouth of the molded container after first removing the container from the blow molding die 1.

The principles of the present invention are of course not limited to the embodiment described above, and various modifications may be made thereto to the extent that they do not depart from the gist of the invention.

For example, while the first port 20c is used as an injection port for feeding the pressurized liquid L into the feed path 20, and the second port 20d is used as a discharge port for returning the liquid L in the feed path 20 to the pressurized liquid feed unit 32 in the embodiment described above, it is also possible to use the second port 20d as an injection port for feeding the pressurized liquid L to the feed path 20, and the first port 20c as a discharge port for returning the liquid L in the feed path 20 to the pressurized liquid feed unit 32.

In the embodiment described above, the flow path body 20a is formed so as to have a constant inner diameter; however, the present invention is not limited to such an arrangement, and the flow path body 20a may be formed in a shape such that the inner diameter thereof gradually decreases from the first port 21c to the blow nozzle 13. In such a case, the flow path body 20a may be formed in a tapered shape in which the inner diameter decreases from the first port 21c toward the blow nozzle 13, or in a stepped cylindrical shape in which the inner diameter decreases stepwise from the first port 21c toward the blow nozzle 13. While it is considered optimal for the flow path body 20a to be formed so as to have a circular cross-sectional shape, it is also possible for the flow path body 20a to have a cross-sectional shape other than circular. In such cases, a transition section smoothly connecting the inner surfaces of the flow path body 20a and the dome chamber 20b is provided so as to prevent the formation of stepped sections in which air pockets could form.

In the embodiment described above, the dome chamber 20b is formed in a hemispherical shape having the same diameter as the flow path body 20a; however, the present invention is not limited to such a configuration, and various shapes, such as a partially cut-out spherical surface or a curved surface flatter than a hemispherical shape, can be used as long as a dome shape is formed that is capable of smoothly connecting the flow path body 20a and the first port 20c so that no steps are created at which air pockets could form. In such cases, a transition section smoothly connecting the inner surfaces of the flow path body 20a and the dome chamber 20b is preferably provided so as to prevent the formation of stepped sections in which air pockets could form.

In the embodiment described above, the liquid circulation section 33 is provided along the conduit R3 connecting the second port 20d and the pressurized liquid feed unit 32; however, the present invention is not limited to such an arrangement, and the liquid circulation section 33 may also be provided along the conduit P2 connecting the pressurized liquid feed unit 32 and the first port 20c.

In the embodiment described above, an example of using pressurized liquid L to draw a pressurized liquid L into an expanded state, thereby molding a container, was described; however, it is also possible to perform biaxial orientation blow molding by using the rod 40 as a drawing rod, and using the rod 40 to draw the preform PF in the longitudinal direction while using the pressurized liquid L to expand the preform outward. An arrangement not provided with a rod 40 is also possible. In such cases, a through-hole for admitting the rod 40 is not provided in the center of the seal member 25.

In the embodiment described above, the valve mechanism 22 causes the tapered contact surface 25a of the seal member 25 to contact and separate from the seal part 21a; however, the present invention is not limited to such a configuration, and various types of valve mechanisms can be employed out of consideration for seal properties, ease of opening and closing, etc.

Preforms PF of various shapes and materials can be used as long as they are constituted by thermoplastic resin materials formed into a closed-bottom cylindrical shape.

The invention claimed is:

1. A liquid blow-molding apparatus comprising:
a blow molding die in which is disposed a closed-bottom cylindrical preform;
a support block disposed above the blow molding die and having a feed path formed in its interior;
a blow nozzle that is provided at a lower end of the support block continuously with the feed path and that engages with a mouth of a preform disposed in the blow molding die; and
a pressurized liquid feed unit connected to the feed path, pressurized liquid being fed from the pressurized liquid feed unit through the blow nozzle into the interior of the preform to liquid blow-mold the preform into a shape conforming to a cavity of the blow molding die;
the feed path has a shape further comprising:
a flow path body having a vertically extending inner diameter that is one of constant or decreases toward the blow nozzle,
a dome chamber that is formed in a domed shape and is continuous with an upper end of the flow path body,
a first port that has the same upper end as the dome chamber and which extends horizontally from the dome chamber, and
a second port connected to the flow path body;
a valve mechanism for opening and closing an open-and-closable flow path connecting the flow path body and the blow nozzle, the valve mechanism being provided in the open-and-closable flow path; and
a liquid circulates between the feed path and the pressurized liquid feed unit when the valve mechanism is in a closed state, and pressurized liquid being fed from the feed path through the blow nozzle into the interior of the preform when the valve mechanism is in an open state.

2. The liquid blow-molding apparatus according to claim 1, wherein the first port and the second port communicate via a liquid circulation section configured to adjust the pressurized liquid feed unit and the liquid to a specific temperature.

3. The liquid blow-molding apparatus according to claim 2, further comprising an air release valve is provided at a site at the highest location of a circulation path leading from the pressurized liquid feed unit through the feed path and the liquid circulation section back to the pressurized liquid feed unit.

4. The liquid blow-molding apparatus according to claim 1, wherein:
a rod-shaped seal pin that passes through the flow path body and is capable of movement in the vertical direction is provided in the support block; and
the valve mechanism is placed into a closed state by a lower end of the seal pin contacting a seal part provided in the open-and-closable flow path, and the valve mechanism is placed into an open state by the lower end of the seal pin moving away from the seal part.

5. The liquid blow-molding apparatus according to claim 4, wherein the seal pin comprises a rod slidably inserted in a liquid-tight state into a tubular housing.

* * * * *